(12) United States Patent
Siaw

(10) Patent No.: US 9,046,409 B2
(45) Date of Patent: Jun. 2, 2015

(54) WEIGHING SCALE FOR FORKLIFT FOR MEASURING WEIGHT OF LOADS AS THEY ARE LIFTED

(76) Inventor: Seng Siong Siaw, Port Klang (MY)

( * ) Notice: Subject to any disclaimer, the term of this patent is extended or adjusted under 35 U.S.C. 154(b) by 424 days.

(21) Appl. No.: 13/388,604

(22) PCT Filed: Jul. 29, 2010

(86) PCT No.: PCT/MY2010/000132
§ 371 (c)(1),
(2), (4) Date: Mar. 28, 2012

(87) PCT Pub. No.: WO2011/019265
PCT Pub. Date: Feb. 17, 2011

(65) Prior Publication Data
US 2012/0175169 A1     Jul. 12, 2012

(30) Foreign Application Priority Data
Aug. 13, 2009  (MY) ................................. PI20093366

(51) Int. Cl.
| | |
|---|---|
| *G01G 3/13* | (2006.01) |
| *G01G 21/02* | (2006.01) |
| *G01G 19/08* | (2006.01) |
| *G01G 19/12* | (2006.01) |
| *B66F 9/20* | (2006.01) |
| *B66F 9/075* | (2006.01) |
| *B66F 17/00* | (2006.01) |

(52) U.S. Cl.
CPC ................ *G01G 19/083* (2013.01); *B66F 9/20* (2013.01); *B66F 17/003* (2013.01)

(58) Field of Classification Search
CPC ... G01G 19/083; G01G 21/24; G01G 21/245; B66F 9/20; B66F 17/003

USPC .................. 177/136, 139, 229; 187/237–238; 414/21
See application file for complete search history.

(56) References Cited

U.S. PATENT DOCUMENTS

| | | | | |
|---|---|---|---|---|
| 3,231,035 A | * | 1/1966 | Wise .............................. | 177/139 |
| 3,910,363 A |  | 10/1975 | Airesman | |
| 5,262,598 A | * | 11/1993 | Stotler et al. .................. | 177/229 |
| 6,069,325 A | * | 5/2000 | Aoki .............................. | 177/136 |
| 7,026,557 B2 | * | 4/2006 | Rice et al. ..................... | 177/136 |

(Continued)

FOREIGN PATENT DOCUMENTS

| | | |
|---|---|---|
| EP | 0438660 | 7/1991 |
| JP | 09-110396 | 4/1997 |
| JP | 2001-335300 | 12/2001 |

(Continued)

OTHER PUBLICATIONS

International Search Report mailed Apr. 27, 2011, PCT/MY2010/000132.

*Primary Examiner* — Randy W Gibson
(74) *Attorney, Agent, or Firm* — Casimir Jones S.C.

(57) ABSTRACT

A weighing scale for forklift and the like (10) for measuring weight of loads at the time they are lifted. The weighing scale comprises a stationary first member (12) and a movable second member (48) interconnected in a vertical parallel spaced apart relationship. The first member is mountable on fork carriage and the second member is connectable to fork thereto. There is a load cell (28) in the first member that works cooperatively with a means (60) in the second member to register any vertical displacements thereof and translate the registered data into weight lifted by the fork.

7 Claims, 7 Drawing Sheets

(56) References Cited

U.S. PATENT DOCUMENTS

| | | | |
|---|---|---|---|
| 8,353,388 B2 * | 1/2013 | Rice et al. | 187/237 |
| 2009/0260924 A1 * | 10/2009 | Rice et al. | 187/238 |

FOREIGN PATENT DOCUMENTS

| | | |
|---|---|---|
| JP | 2007-008614 | 1/2007 |
| JP | 2009-012942 | 1/2009 |

* cited by examiner

WEIGHING SCALE FOR FORKLIFT FOR MEASURING WEIGHT OF LOADS AS THEY ARE LIFTED

TECHNICAL FIELD

This invention relates to weighing scale, more particularly for the type that can be incorporated in forklift and the like for weighing loads at the same time they are lifted.

TECHNICAL BACKGROUND

Forklifts are common industrial vehicle used to transport goods in factories, warehouses and so on. In general, most forklifts in the market are not fitted with any measurement system for weighing goods that they carry. Such design of forklift poses great inconveniences to operators because they would then have to make extra time consuming trips to floor scales for weighing the goods.

Without any weighing system being mounted on the vehicle, forklift operators would have to look for a space within factory premises to install a floor scale. Such arrangement would put further pressure on the already congested space problem within a factory. For weighing goods, operators would have to spend a lot of time and efforts maneuvering their forklift machines in factory environment first by lifting up the goods, then sending them to the floor scale, unloading them thereon for taking measurement and finally collecting them for the eventual designation. Apparently, such procedure is very time consuming and would certainly contribute towards higher operation costs.

There are however, forklifts and other transport trucks in the market that are fitted with load cells for weighing goods that they carry. However, such vehicles are not exactly popular due to their clumsy designs and other shortcomings especially in providing accurate readings on the weight of loads carried. Due to their sophisticated designs, such vehicles are expensive to manufacture and priced beyond the reach of most users.

In addition, many conventional forklifts that are fitted with weighing system do encounter design weaknesses, for example the weighing units thereto are usually being installed in positions whereby they can be easily damaged due to the rough ways goods are being handled during transportation. If the weighing units like load cells etc. are too exposed, they can really be subject to regular bangs and knocks. Such unwarranted impacts on load cells would soon render them unsuitable for use because accuracy would be lost. As a result, most forklift operators would still prefer to use floor scale for weighing their goods.

JP 2009 012942 discloses a fork support base arranged in front of a fork lift side base plate lifted/lowered by the lifting device of the fork lift. A load cell support base is provided in the fork lift side base plate, and a load cell pressing section is provided in the support base.

U.S. Pat. No. 3,231,035 discloses a weighting scale, with a base portion and a load-supporting portion movable under weighing loads with respect to the base portion and a lever system fulcrumed on one of said portions.

JP 63 180700 discloses a weighing device and a fork lift.

EP 0438660 discloses a force measuring device, in which a force introducing device is provided to which the projecting load can be fastened. The force introducing device is movably connected to a force absorbing device via at least one rotary measuring bearing.

Therefore, it is a primary object of the present invention to provide a weighing scale for forklift and the like that has simple minimal parts and can be constructed fairly inexpensively. To suit ordinary operators, such weighing scale can be easily installed onto conventional forklifts and the like without having to do any modification to the existing vehicle.

The weighing scale according to the present invention is capable for weighing loads in forklift at the same they are lifted. No separate floor scale would ever be required to perform the weight measurement job. The invention should help forklift operators to save invaluable time and efforts and contribute towards lowering operation costs in transportation of goods.

It is yet another important object of the present invention to provide a weighing scale for forklift and the like that is not only low in production cost but also durable for use even in rugged warehouse conditions. The proposed weighing scale is made up of strong robust components which require fairly minimal maintenance.

Still a further object of the present invention is to provide a weighing scale for forklift and the like that can always be dependable for accurate weight measurement, even in uneven terrain within factory premises. Due to its intrinsic design, the proposed weighing scale includes provisions that the incorporated load cell is always shielded off and well protected against any possible impacts despite the rough ways goods are being handled during transportation. If the working condition of load cells is assured, forklift operators can expect accurate readings at all time.

Other objects and advantages of the present invention will become more apparent from the following description taken in connection with the accompanying disclosure of preferred embodiments of the invention.

SUMMARY OF THE INVENTION

The above-mentioned objects are achieved by the provision of a weighing scale having all the technical features, in combination, of claim 1.

The present invention relates to a weighing scale for forklift and the like to be installed between the fork carriage and fork thereto for weighing loads as they are lifted comprises a stationary first member, a movable second member, a pair substantially identical linkage elements each interconnecting said first member and second member, a load cell and a means incorporated in said second member.

The stationary first member is mountable on the fork carriage. The movable second member is connectable to the fork. The pair of substantially identical linkage elements each are interconnecting said first member and second member at separate positions thereof such that said first member and second member are disposed in vertically parallel spaced apart relationship wherein each linkage element has a general four-sided configuration comprising a pair of parallel opposed shafts connected at their respective axially terminal ends thereto by a pair of link arms so that each linkage element has one shaft installed on said first member and another shaft installed on the second member in order that said second member moves in a vertical plane about the stationary first member with low frictional forces.

The load cell is installed on said first member and being accessible by said second member. The means incorporated in said second member is adapted to work cooperatively with said load cell to register any vertical movement thereto and transform the registered data into weight of the load being lifted by the fork.

DESCRIPTION OF SPECIAL EXAMPLE

The invention will now be described by way of preferred embodiments and with reference to the accompanying drawings in which.

A conventional forklift has the usual vertical fork carriage in front which includes mounting straps for fork or forks to be mounted thereto. Said fork carriage is generally operated by hydraulic or similar means to move in upward and downward directions such that the laterally installed fork or forks can be accessed into pallets that have been stacked at different heights. Such pallets are then lifted with the loads thereto and carried to designated places. In this connection, the following description illustrates how a preferred embodiment of the present invention is used for weighing loads as they are lifted by the forklift.

Figure 1:
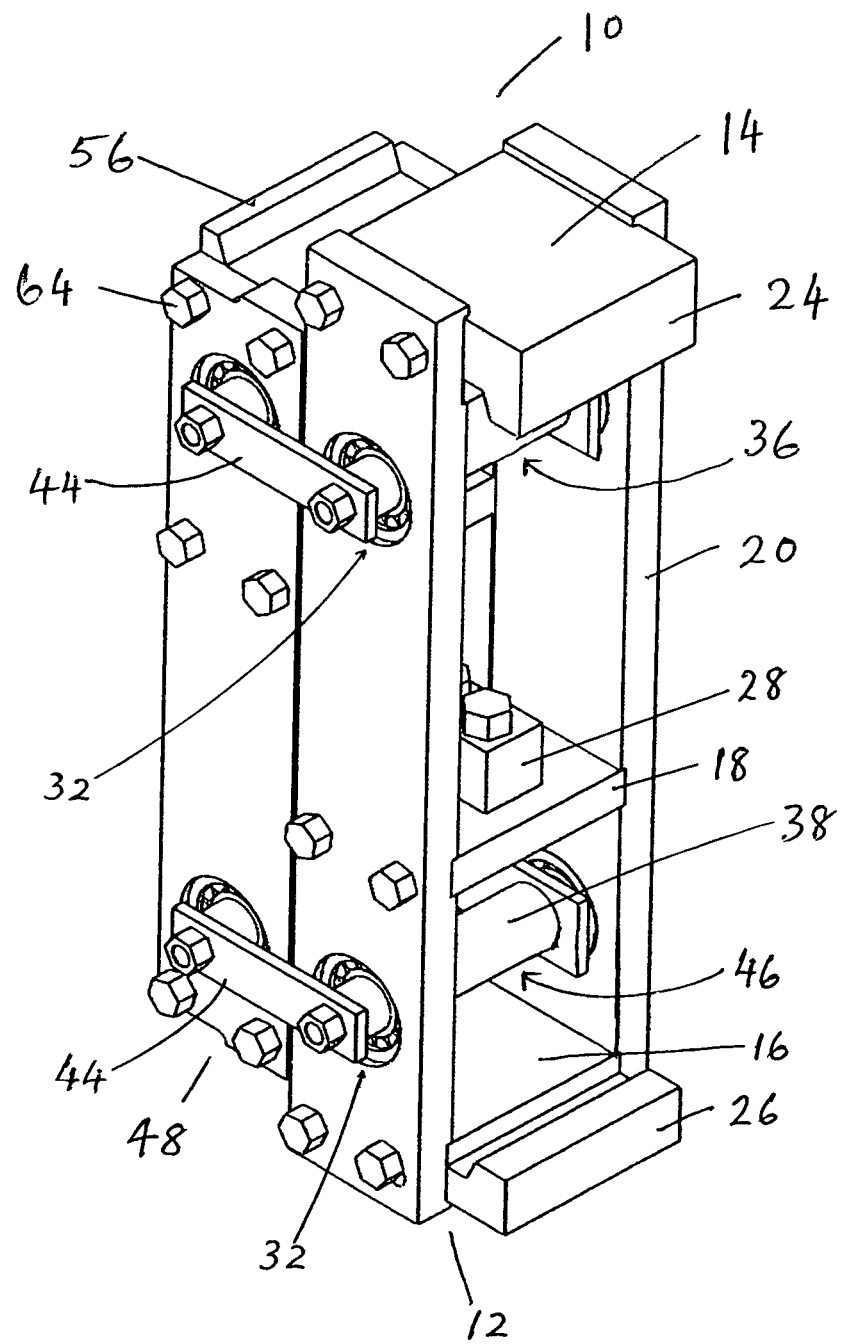
FIG. 1 shows a perspective view of the weighing scale for forklift according to a preferred embodiment of the present invention.

Referring now to the drawings, FIG. 1 is a perspective view of the preferred embodiment for the weighing scale 10 for use in forklift and the like according to the present invention. Said weighing scale is to be installed between a fork carriage (not shown) and a fork (not shown). Apparently, more than one fork can be installed thereto for which the present invention is equally applicable.

Figure 2:
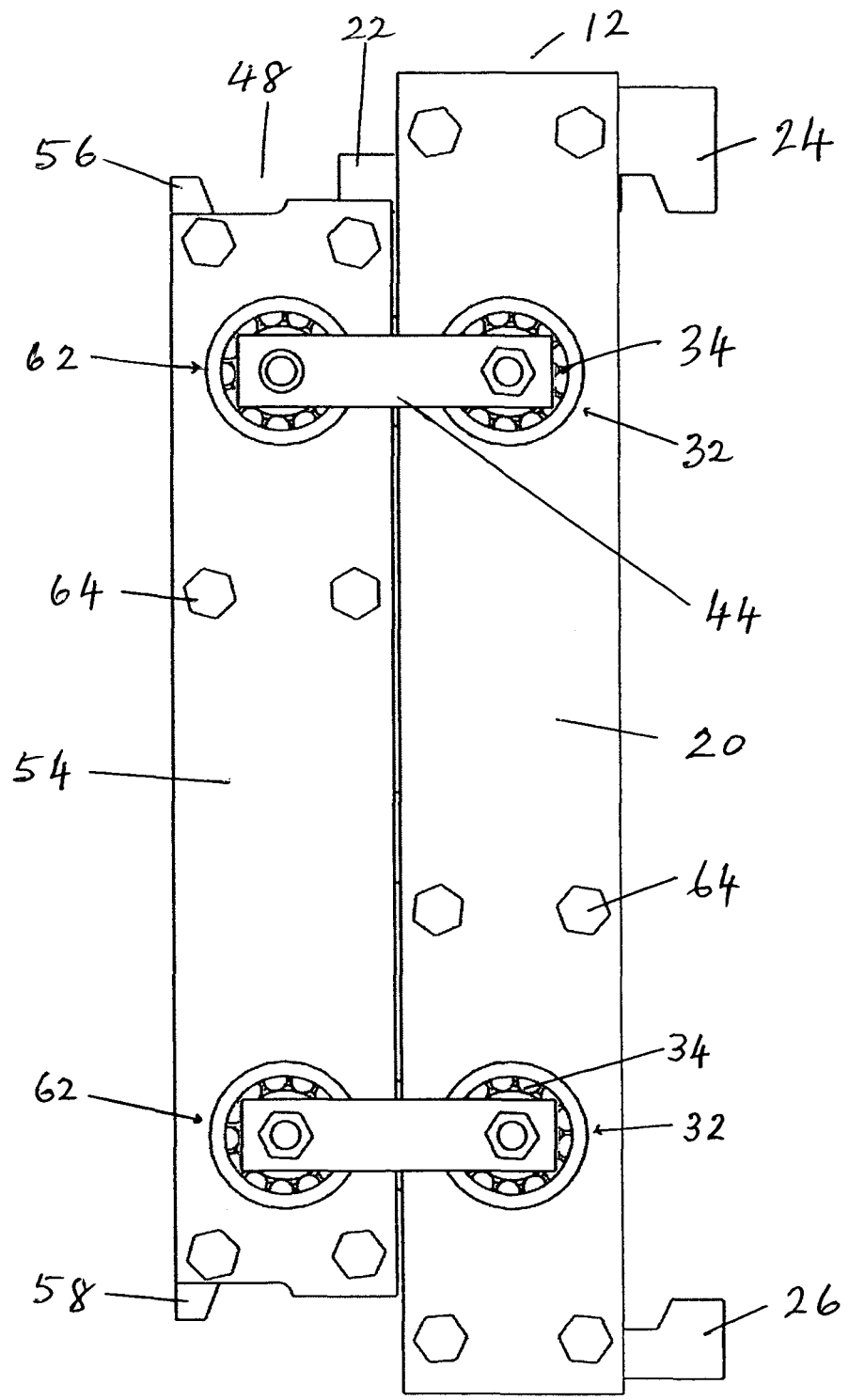
FIG. 2 shows side view of the weighing scale as depicted in FIG. 1.

The weighing scale 10 includes a first member 12 and a second member 48, which are interconnected and disposed vertically in parallel spaced apart relationship as shown in FIG. 1 and FIG. 2. The construction and technical features of said first member, second member and other components together with their inter-working relationship would be described hereinafter.

Figure 3:
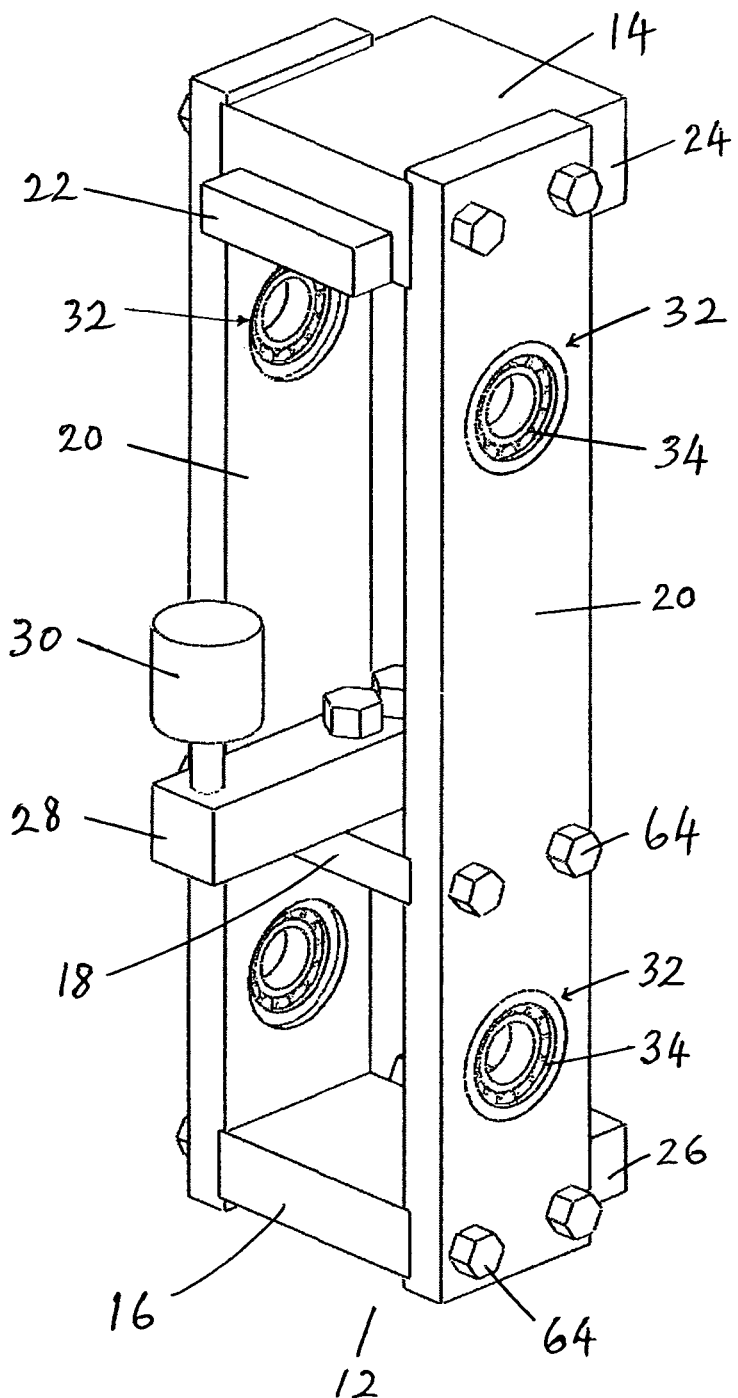
FIG. 3 shows a perspective view of the first member of the weighing scale according to the present invention.

Said first member 12 is a substantially elongate solid structure constructed of robust steel material which has a fairly uniform U-shaped cross section along the length thereto. As shown in FIG. 3, said first member includes a top plate 14, bottom plate 16, and two substantially parallel vertical side plates 20 which extend forwardly. Edges of the various plates thereof are connected together via bolts and nuts 64 or other suitable means to form an elongate structure as illustrated. For convenience, all bolts and nuts depicted in the drawings would be designated by the numeral 64 hereafter.

As shown in FIG. 2 and FIG. 3, the top plate 14 of said first member 12 includes in front a ridge 22 which is in the form of a bar disposed transversely across the upper end thereto and at the back a hook 24 capable for mounting onto a fixed structure. The bottom plate 16 includes at the back another hook 26 having essentially similar function as that for the top hook 24. Accordingly, both said hooks 24, 26 for the top plate 14 and bottom plate 16 respectively are adapted for mounting said first member 12 firmly onto the fork carriage by any suitable mechanical method.

Installed midway between said top plate 14 and bottom plate 16, there is a support 18 in the form of a bracket which extends transversely across to the two side plates 20 of said first member 12 as shown in FIG. 3. Said support has its edges firmly connected to the surrounding wall of said side plates by suitable mounting means such as bolts and nuts 64. On top of said support, a load cell 28 is mounted which protrudes slightly out of the profile of said first member 12 in front. On the upper side of said load cell, a force focusing device 30 is secured thereon as shown in FIG. 3. As such, said load cell 28 is surrounded by said top plate 14, bottom plate 16 and side plates 20.

As shown in the figures, the two vertical side plates 20 of said first member 12 each include a set of upper and lower slots 32 thereto. For convenience, all the slots of said first member would be designated by numeral 32 hereafter. The two upper slots of the side plates align laterally in a transverse axis to form an upper row of slots in said first member 12 and the two lower slots of the side plates also align laterally in similar manner to form a lower row of slots which is parallel to its counterpart above. These slots 32 are substantially of same circular dimension, each having a housing wherein a roller bearing 34 is installed and snugly recessed therein. For convenience, all roller bearings hereto would be designated by the numeral 34. It must be appreciated that other types of rolling-element bearings such as ball bearings and spherical roller bearings are equally applicable in this connection.

Figure 5:
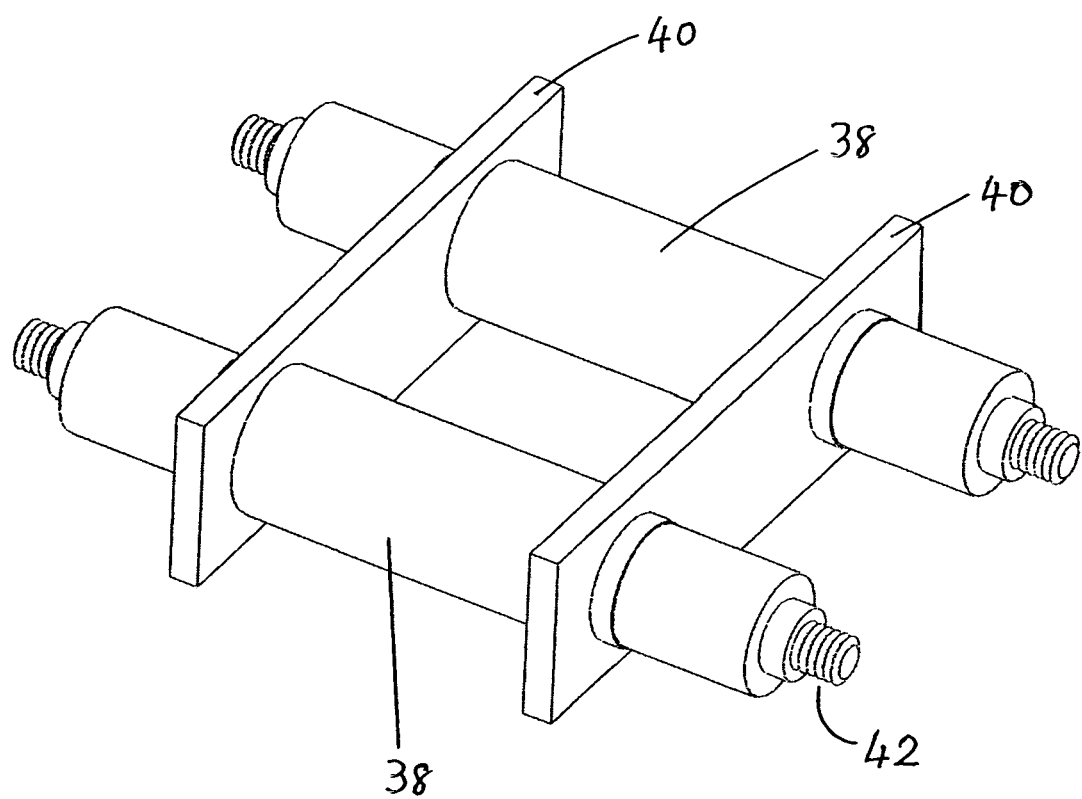
FIG. 5 shows an enlarged perspective view of the linkage element of said weighing scale according to the present invention.

As shown in FIG. 1, secured respectively to the upper row and lower row of slots 32 in said first member 12 is a pair of substantially identical linkage elements 36, 46, each having a general four-sided configuration as illustrated in FIG. 5. A further exploded view of components closely associated with the linkage element is shown in FIG. 6.

According to the preferred embodiment of the present invention, each linkage element has a general parallelogram configuration which includes a pair of parallel opposed shafts 38 whose axially terminal ends are fixedly connected by a pair of parallel opposed link arms 40 via mechanical means such as welding. For convenience, the shafts and link arms for linkage element would be designated by numerals 38 and 40 respectively.

Figure 7:
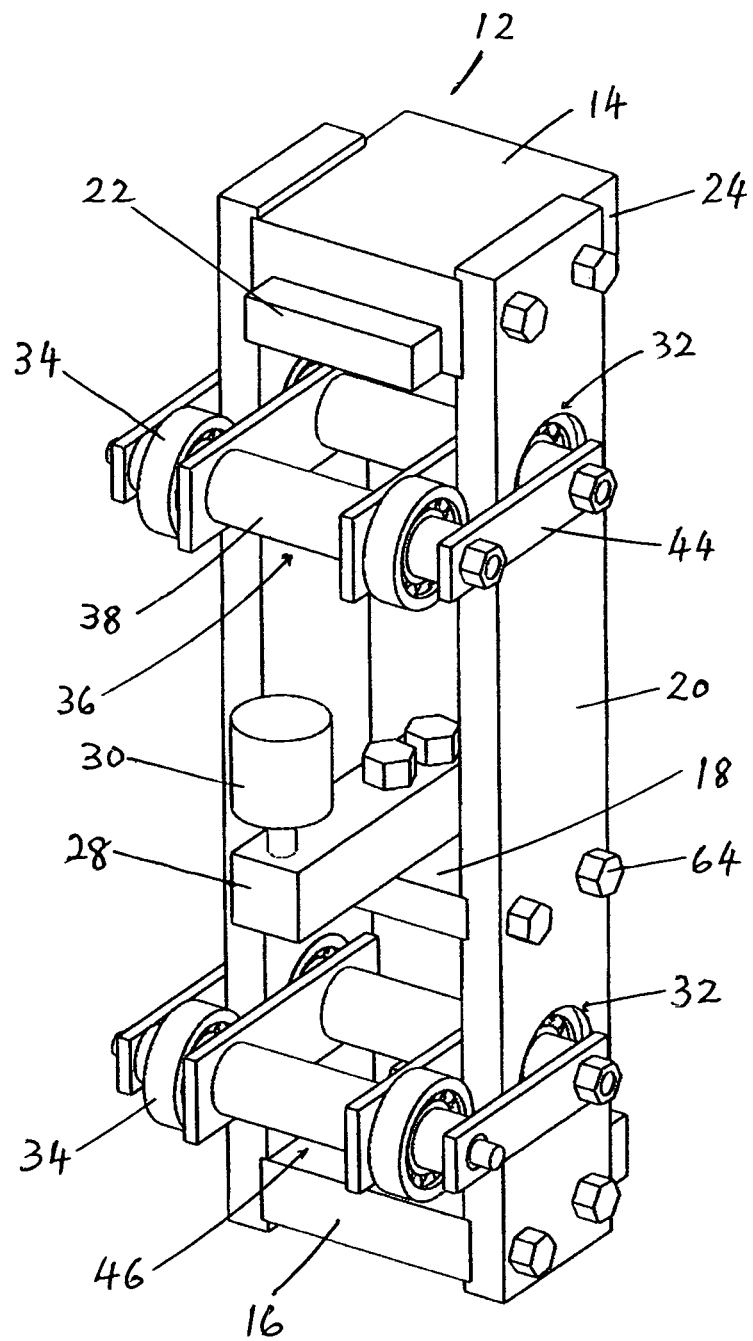
FIG. 7 shows the pair of linkage elements and reinforced bars being fitted to the first member of the present invention for illustration purpose.

As shown in the figures, the respective axially terminal end of each shaft is adapted to be snugly received within the inner race of the corresponding roller bearing such that the shaft concerned is rotatably supported therein as illustrated in FIG. 1 and FIG. 7. For securing the two linkage elements 36, 46 to said first member 12, it is obvious to a man skilled in the art to ensure that the outer race of each roller bearing is adapted to be snugly received within the slot concerned.

Figure 6:
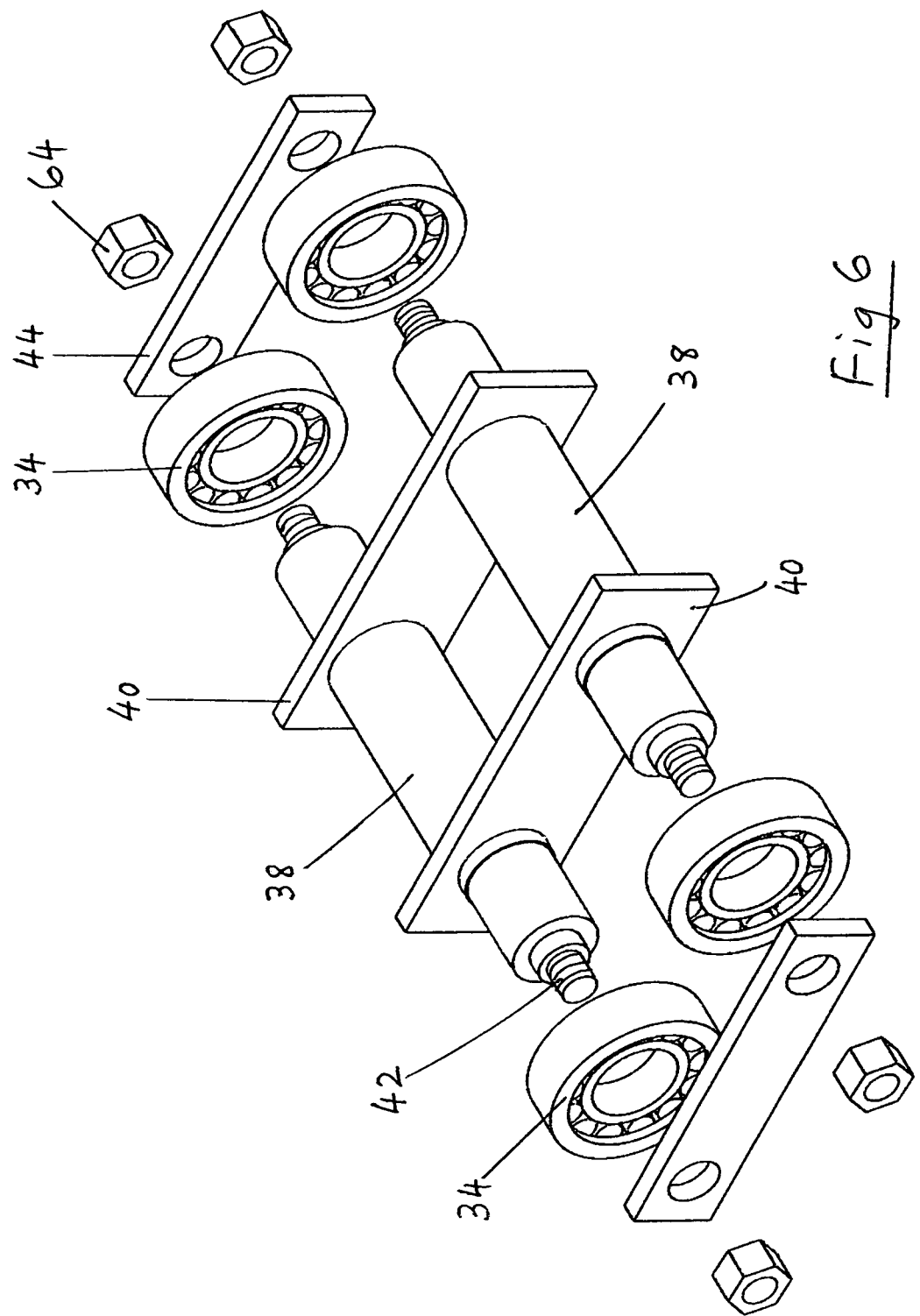
FIG. 6 shows an exploded view of components closely associated with the linkage element according to the present invention.

As shown in FIG. 5 and FIG. 6, the axially terminal ends of the shafts 38 each terminate with a reduced diameter portion 42 which is provided with screw threads. All reduced diameter portions are being designated by the numeral 42. Upon securing the two linkage elements to said first member 12, said reduced diameter portions project slightly out on the external side of the corresponding side plates thereof. According to the present invention, the projected portions of said first member 12 would be firmly connected to similar projected portions on the same side of the second member 48 by corresponding upper and lower external reinforced cross bars 44 via suitable mechanical connection means when the first member and second member are interconnected later on as depicted in FIG. 1 and FIG. 2.

FIG. 7 illustrates the pair of identical linkage elements 36, 46 being successfully installed onto said first member 12 which is disposed in a vertical position. As shown, the respective reinforced cross bars, generally designated by the numeral 44, have also been installed in position thereto. When installed, each linkage element is capable to move freely in upward and downward directions about a transverse axis because one of its shafts has been hinged to said first member.

Because of the low operative friction of roller bearings, both linkage elements 36, 46 are capable to move in upward and downward directions with very low frictional forces.

Figure 4:
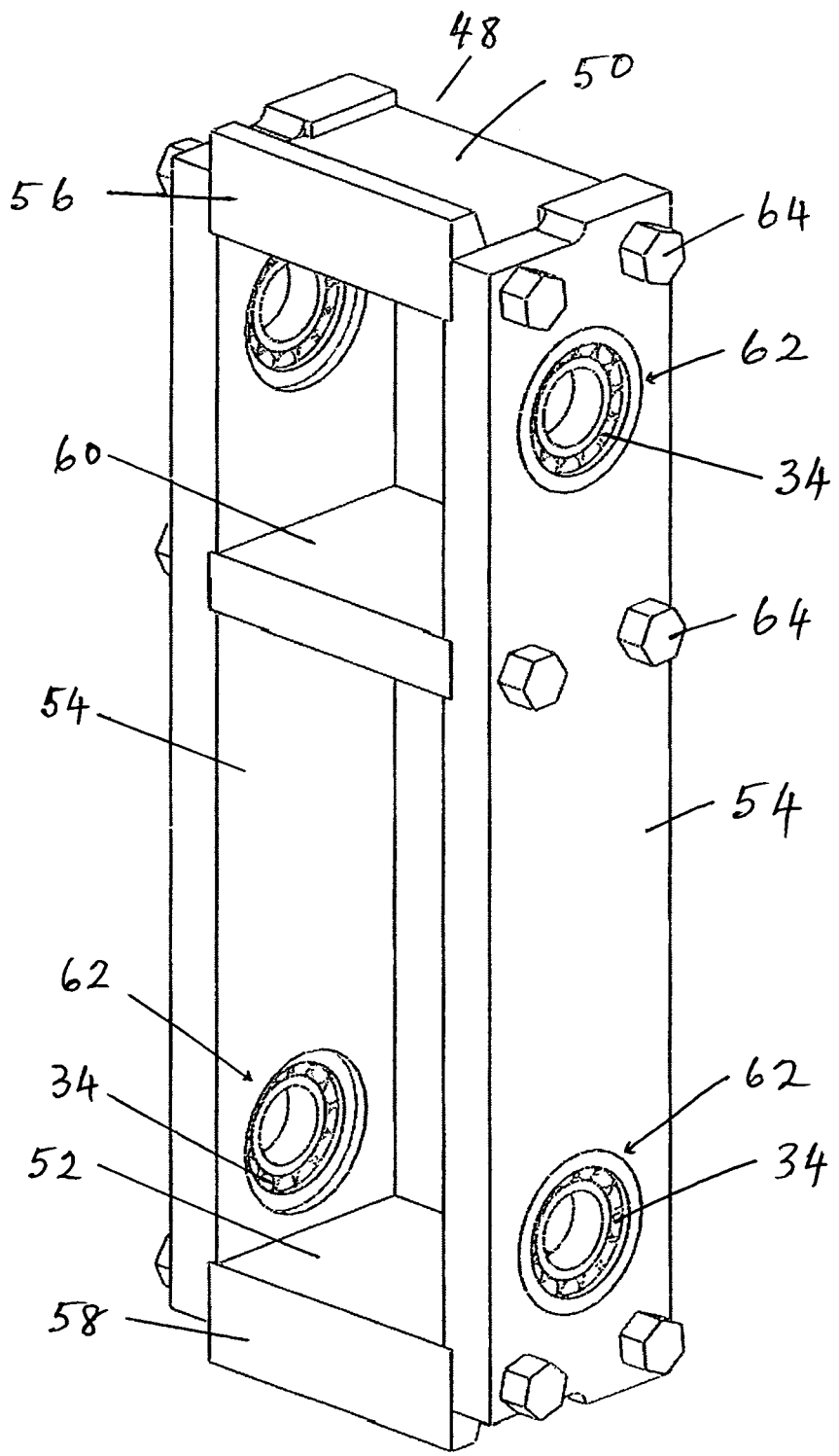
FIG. 4 shows a perspective view of the second member of the weighing scale according to the present invention.

FIG. 4 shows the second member 48 according to a preferred embodiment of the present invention which has a substantially elongate structure as that for said first member 12 and is also constructed of robust steel material. Said second member 48 has a fairly uniform cross section along the length thereof which comprises a top plate 50, bottom plate 52 and two vertical side plates 54. As shown, the top plate and bottom plate are connected to the side plates 54 by external bolts and nuts 64. Said top plate 50 and bottom plate 52 have in front fastening means 56, 58 respectively to which the fork can be fixedly attached for lifting loads thereto.

Approximately midway between said top plate 50 and bottom plate 52, a load bar 60 in the form of a flat solid structure is transversely installed and disposed transversely across the two vertical side plates 54, said load bar being firmly kept in position thereto via external bolts and nuts as shown. As would be described later, said load bar 60 is positioned in such a way that it can access to the force focusing device 30 and load cell 28 of said first member 12 and thus serves as a means to work cooperatively with the same for measuring weight of loads lifted by the forklift. In this regard, it must be appreciated that knowledge concerning application of force focusing device and load cell for measuring weight of loads by the concept of gravitational force is something readily available in the prior art.

In FIG. 4, said side plates 54 each further include a set of two upper and two lower slots 62. For convenience, all slots of said second member 48 would be designated by numeral 62 hereafter. The upper slots of said second member 48 align laterally in a transverse axis to form an upper row of slots and the lower slots too align laterally in similar manner to form a lower row of slots which is parallel to its counterpart above. These slots 62 are substantially of same circular dimension, each having a housing wherein a roller bearing 34 is installed and snugly recessed therein. As mentioned earlier, other types of similar rolling-element bearings are equally applicable for such application.

In a typical installation as shown in FIG. 1 and FIG. 2, said linkage elements 36, 46 interconnect the first member 12 and the second member 48 into a vertically parallel spaced apart relationship. Dimensionally, only a small space separates said first member and second member. In this position, a small axially terminal end portion of each shaft of the linkage elements 36, 46 projects out of the respective side plate of said first member 12 and second member 48. As indicated earlier, the projected portion of the upper slot for the first member is firmly connected to that of the upper slot on the same side for said second member by a reinforced cross bar 44 via suitable mechanical connection means like bolts and nuts 64. Accordingly, all projected portions are connected to their corresponding counterparts in this way as shown in FIG. 1 and FIG. 2. Said reinforced cross bars 44 would help strengthen the interconnection between said first member and second member.

Upon installation to the stationary first member 12, the second member 48 is capable to move freely in upward and downward directions about the pivoted shafts of the linkage elements 36, 46 that have been rotatably supported within the row of upper slots and row of lower slots in said first member respectively. Due to the properties of the roller bearings thereof, said second member 48 experiences very low frictional forces during its upward and downward movement. As the two pivoted shafts mounted on said first member are disposed in transverse axis and parallel to each other, said second member 48 is capable to move in a single vertical plane.

At the initial installed position when there is no load on the fork, the load bar 60 of said second member 48 is adapted to rest on the load cell 28 by just touching on the top surface of the force focusing device 30, said load cell being mounted on the support 18 of said first member 12 earlier. Henceforth, said load cell 28 is only experiencing the weight of said second member and the components that it carries but without any load on the fork. At this position, the back vertical terminal end of the top plate 50 of the second member 48 is disposed immediately below the ridge 22 of said first member 12. Generally, at this position said load cell 28 is calibrated to a certain standard value which would be used later on as a basis for calculating the weight of load lifted by the fork thereto.

When a load e.g. a pallet together with the goods thereon is lifted by the fork, its weight is transmitted directly to the second member 48 causing the latter to move vertically downward. The movement of said second member is guided by the two linkage elements 36, 46 which are interconnecting said second member 48 to the first member 12. As explained earlier, said linkage elements would ensure that the second member 48 moves in a single vertical plane parallel to the first member 12 with low frictional forces.

As said second member 48 moves vertically downward, the load bar 60 moves down therewith. Said load bar cooperatively works with the load cell 28 of the first member 12 to measure weight of the load that has been lifted by the forklift in that said load bar 60 comes down on said force focusing device 30 due to the combined weight carried by said second member 48. The downward movement of said load bar 60 would be accordingly registered by said load cell 28 and translate thereto into weight of the load lifted by the fork.

The foregoing description of the preferred embodiments has been presented for purposes of illustration and description. It is not intended to be exhaustive or to limit the invention to the precise forms or structures disclosed. Obviously, many modifications and variations will be apparent to practitioners skilled in the art such as by extending the concept used in the proposed weighing scale into similar apparatus for lifting loads by forklift and the like, as long as they remain within the scope of the present invention which is defined by the appended claims.

The invention claimed is:

1. A weighing scale for forklift (10) to be installed between the fork carriage and fork thereto for weighing loads as they are lifted comprising;
   (a) a stationary first member (12) mountable on the fork carriage;
   (b) a movable second member (48) connectable to the fork;
   (c) a pair of substantially identical linkage elements (36, 46) each interconnecting said first member (12) and second member (48) at separate positions thereof such that said first member (12) and second member (48) are disposed in vertically parallel spaced apart relationship wherein each linkage element (36, 46) has a general four sided configuration comprising a pair of parallel opposed shafts (38) connected respectively at their respective axially terminal ends by a pair of link arms (40) so that each linkage element has one shaft installed on said first member (12) and another shaft installed on said second member (48) in order that said second member (48) moves in a single vertical plane about said stationary first member (12) with low frictional forces, wherein said first member (12) is an elongate structure of substantially uniform U-shaped cross section along the length thereof having a top plate (14), bottom plate (16) and side plates (20) which extend forwardly, wherein said second member (48) is an elongate structure having a top plate (50), bottom plate (52) and two vertical side plates (54), (d) a load cell (28) installed on said first member (12) and being accessible by said second member (48), wherein said load cell (28) is located between the first member (12) and the second member (48) and is surrounded by the various top plates (14), bottom plates (16) and side plates (20) of said first member (12) and said second member (48), and (e) a means (60) incorporated in said second member (48) adapted to work cooperatively with said load cell (28) to register any vertical movement thereto and transform the registered data into weight of the load being lifted by the fork.

2. The weighing scale for forklift (10) according to claim 1 wherein said first member (12) includes a pair of laterally aligned upper slots (32) each provided with recessed rolling-element bearing (34) to which first shaft of first linkage element (36, 46) is rotatably supported and said second member (48) includes a pair of laterally aligned upper slots each provided with recessed rolling-element bearing (34) to which second shaft of the first linkage element is rotatably supported and wherein said first member (12) includes a pair of laterally aligned lower slots each provided with recessed rolling-element bearing to which first shaft of second linkage element is rotatably supported and said second member (48) includes a pair of laterally aligned lower slots each provided with recessed rolling-element bearing to which second shaft of the second linkage element is rotatably supported.

3. The weighing scale for forklift (10) according to claim 2 wherein said rolling-element bearing (34) is roller bearing.

4. The weighing scale for forklift (10) according to claim 1 wherein said linkage elements (36, 46) have axially terminal ends of their shafts which are disposed on the same side being connected by a reinforced cross bar (44) respectively.

5. The weighing scale for forklift (10) according to claim 1 wherein said first member (12) includes a support (18) in the form of bracket having edges firmly secured to the inner sides of the side plates (20) thereof for mounting said load cell (28) thereon.

6. The weighing scale for forklift according to claim 1 wherein said load cell (28) protrudes out of the said first member.

7. The weighing scale for forklift (10) according to claim 1 wherein said means (60) is in the form of a bar resting on top of said load cell (28) via a force focusing device (30) when there is no load being lifted by the fork thereto.

* * * * *